J. H. BAKER.
HORIZONTAL CENTRIFUGAL SCREEN.
APPLICATION FILED MAY 1, 1917.

1,256,507.

Patented Feb. 19, 1918.
6 SHEETS—SHEET 1.

Fig. 1.

Witnesses
C. P. Hardy
H. H. Ray

Inventor
J. H. Baker
By ........ Attorney

J. H. BAKER.
HORIZONTAL CENTRIFUGAL SCRE
APPLICATION FILED MAY 1, 1917.

1,256,507.

Patented Feb. 19, 1918.
6 SHEETS—SHEET 5.

UNITED STATES PATENT OFFICE.

JAMES H. BAKER, OF SARATOGA SPRINGS, NEW YORK.

HORIZONTAL CENTRIFUGAL SCREEN.

1,256,507.   Specification of Letters Patent.   Patented Feb. 19, 1918.

Application filed May 1, 1917. Serial No. 165,768.

*To all whom it may concern:*

Be it known that I, JAMES H. BAKER, a citizen of the United States, residing at Saratoga Springs, in the county of Saratoga and State of New York, have invented certain new and useful Improvements in Horizontal Centrifugal Screens; and I do hereby declare the following to be a full, clear, and exact description of the invention, such as will enable others skilled in the art to which it appertains to make and use the same.

The invention relates to a horizontal centrifugal screen for screening ground wood or sulfite for paper making.

The object of the present invention is to provide a simple, practical and efficient horizontal centrifugal screen designed for screening ground wood or sulfite for pulp making and capable of effectually separating the good stock from the slivers, specks and poor stock and of collecting the good stock and of discharging the said slivers, specks and poor stock from the screen.

A further object of the invention is to provide a horizontal centrifugal screen of this character equipped with a rotary projectile impeller adapted to cause the contents of the screen to be thrown outwardly through the same and capable of operating uniformly on the said material and of preventing the same from sliding laterally off the actuating means, or engaging means of the impeller.

With these and other objects in view, the invention consists in the construction and novel combination of parts hereinafter fully described, illustrated in the accompanying drawings and pointed out in the claims hereto appended: it being understood that various changes in the form, proportion, size and minor details of construction, within the scope of the claims, may be resorted to without departing from the spirit or sacrificing any of the advantages of the invention.

In the drawings:

Fig. 3 is a vertical sectional view taken transversely of the screen.

Like numerals of reference designate corresponding parts in the several figures of the drawings.

Figure 10:
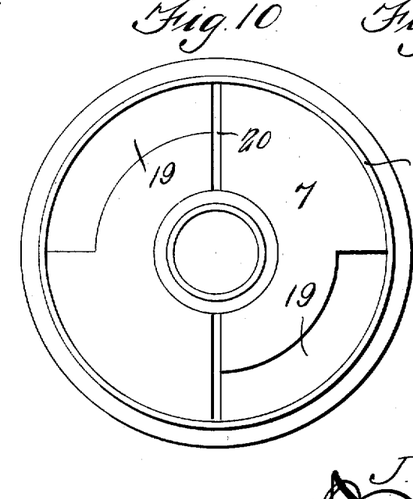
Fig. 10 is a side elevation of the same.
Figure 11:
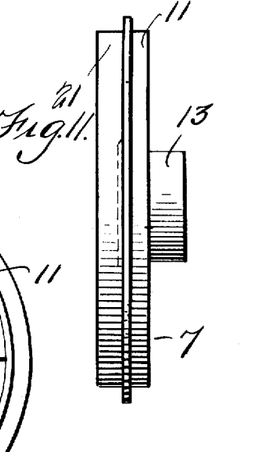
Fig. 11 is an end view of the other screen drum head.
Figure 12:
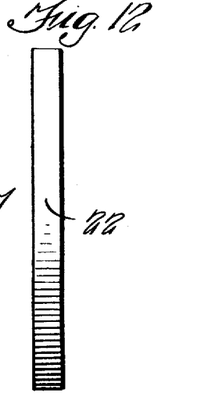
Fig. 12 is a detail view of the exterior ring of the screen drum.

In the accompanying drawings, in which is illustrated the preferred embodiment of the invention, the horizontal centrifugal screen comprises in its construction a casing 1 having a base 2 and being of approximately cylindrical form to receive the rotary screen drum 3. The screen drum, which is mounted for rotary movement on inwardly extending horizontal arms or portions 4 of depending vertically disposed supply pipes 5 of a flow box 6, is composed of heads 7 and 8 and a plurality of screen plates or sections 9 preferably four in number and mounted in screen frames 10 suitably secured to the screen drum heads 7 and 8 at the peripheries thereof. The drum heads are provided with inner annular flanges 11 and 12 for supporting the screen plates or sections and the screen frames and they are also provided with hubs 13 and 14 extending inwardly from the drum heads and mounted on the horizontal portions of the supply pipes 5, the said horizontal portions 4 being preferably turned down to form journals for the rotary drum. The horizontal portions 4, which extend into the drum from opposite sides of the same to feed the material into the screen at opposite sides, are mounted in supports 15 and are clamped therein by suitable caps 16 bolted or otherwise secured to the said supports whereby the side supply pipes are firmly mounted on the frame. The hub 14 of the screen drum head 8 is also provided with an exterior tubular extension 17 on which is mounted a gear 18. The drum head 7 is provided with curved arcuate sliver outlets 19 located adjacent to the periphery of the drum head at opposite points, as clearly illustrated in Fig. 10 of the drawings. The hub 13 of the head 7 is reinforced by diametrically arranged ribs or flanges 20 which are located at the opposite ends of the said sliver outlets 19. On the exterior of the screen drum head 7 adjacent to the periphery thereof is an annular flange 21 located at the outer side walls of the sliver outlets and supporting a ring 22 which projects outwardly beyond the drum sufficiently to direct the slivers and poor stock the desired distance from the drums. The material is delivered to the flow box 6 by a suitable feed pipe 23 forming the inlet to the centrifugal screen, and the feed of the material to the flow box is controlled by a gate valve 24 located at the inlet pipe 23, but a gate valve may be mounted in the inlet pipe or any other suitable means for controlling the feed of the material to the flow box.

Figure 1:
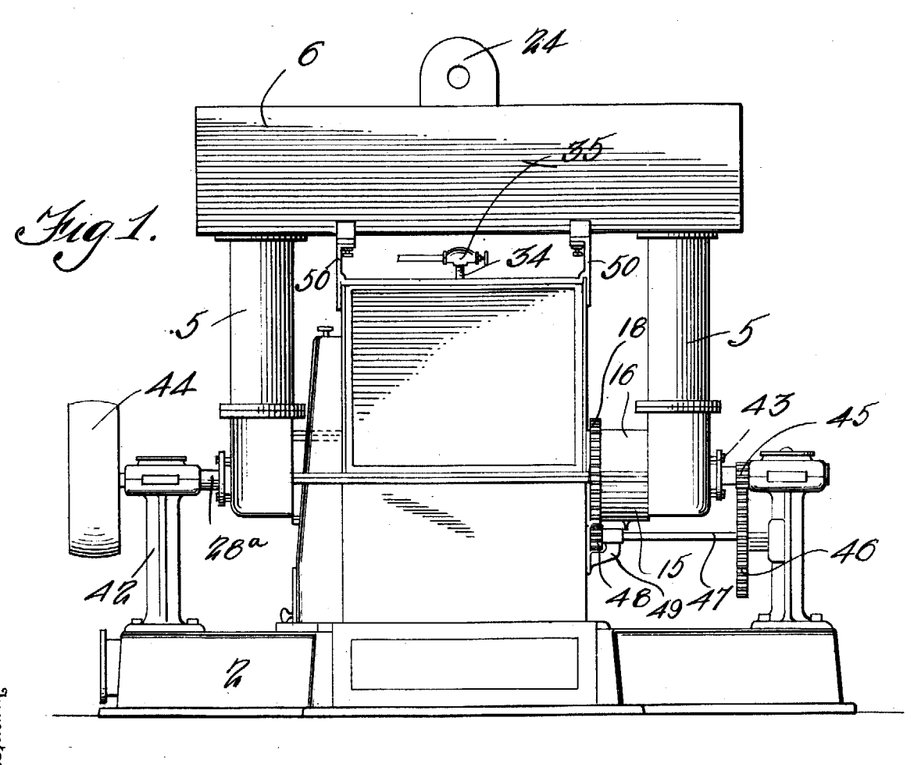
Figure 1 is a front elevation of a horizontal centrifugal screen constructed in accordance with this invention.
Figure 2:
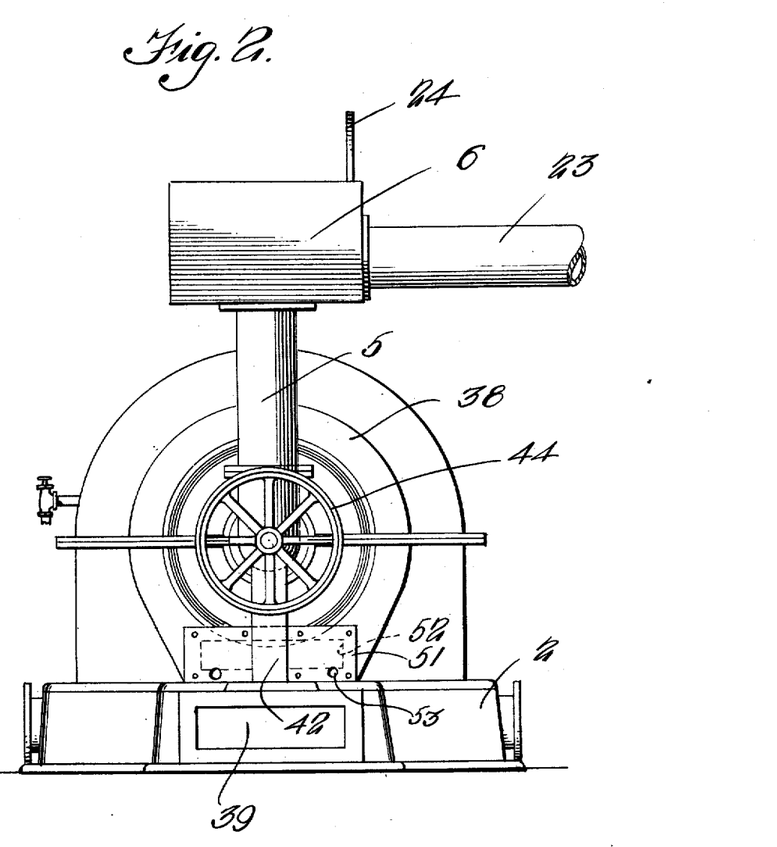
Fig. 2 is a side elevation of the same.
Figure 4:
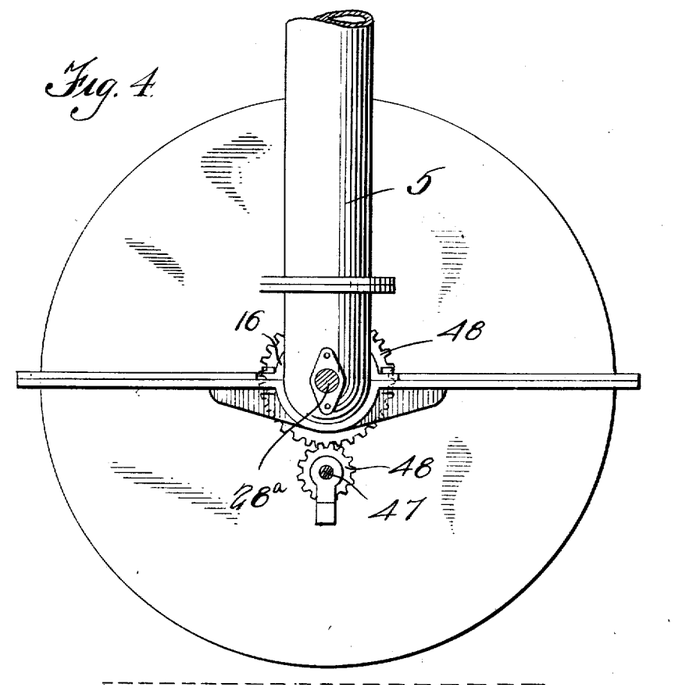
Fig. 4 is a vertical sectional view on the line 4—4 of Fig. 3.
Figure 5:
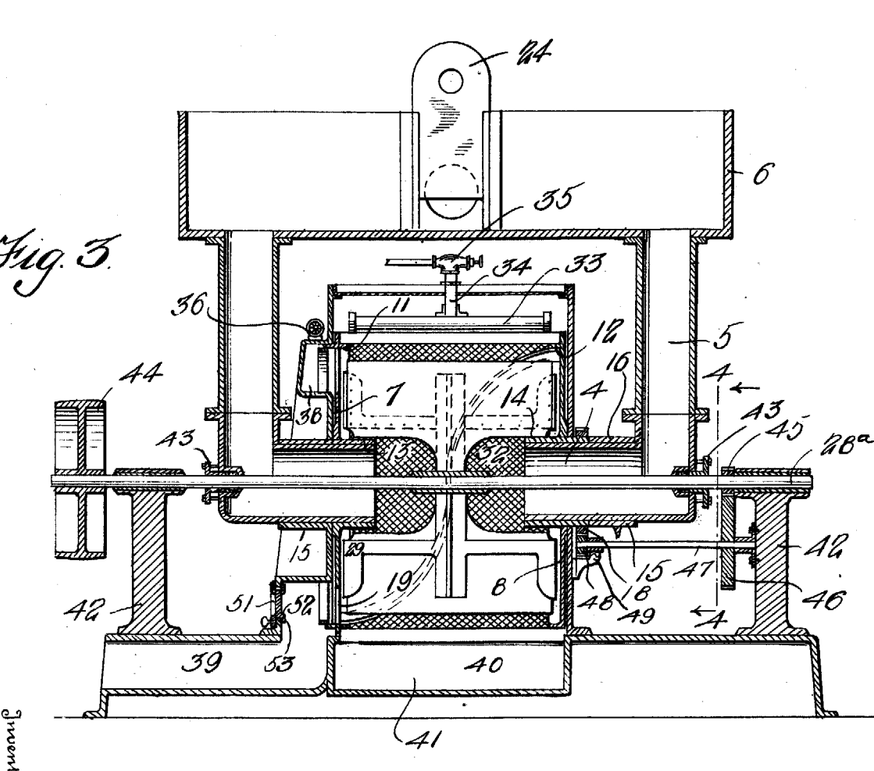
Fig. 5 is a plan view of the base of the casing.
Figure 6:
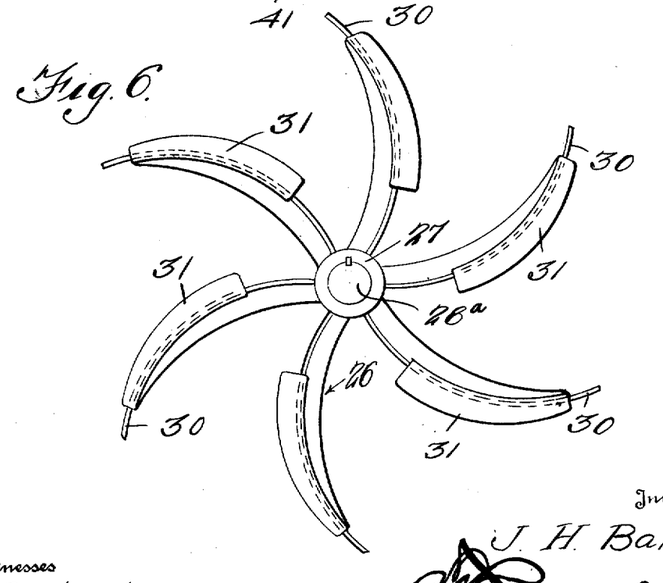
Fig. 6 is a side elevation of the rotary projectile impeller.
Figure 7:
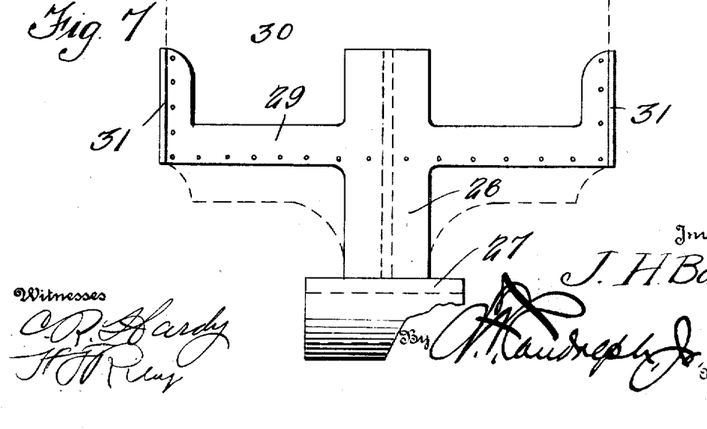
Fig. 7 is an elevation of one of the spoke members of the impeller.
Figure 8:
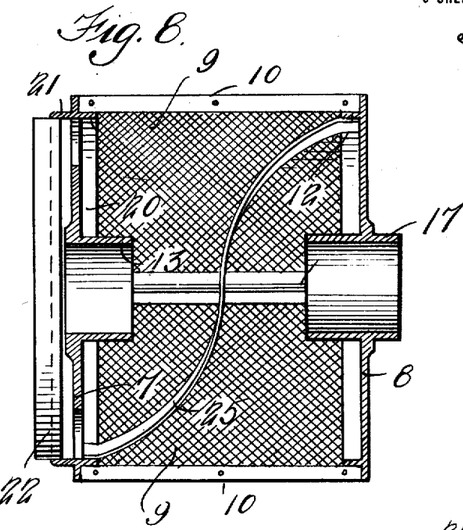
Fig. 8 is a transverse sectional view of the screen drum.
Figure 9:
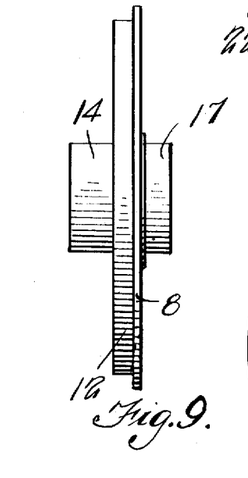
Fig. 9 is an end view of one of the screen drum heads.

The rotary drum is provided on its interior with a spiral flange 25 located at the inner periphery of the drum and forming a worm or conveyer for feeding the slivers, specks and bad stock to the sliver outlets 19. The spiral conveyer flange, which is arranged as clearly illustrated in Fig. 10 of the drawings, may be secured to the drum heads at the flanges 11 and 12, as shown, but it may be mounted in any other desired manner as will be readily understood. The drum operates at a relatively low speed and the centrifugal force is imparted to the material for impelling the good stock and driving the same through the screen pipes or sections of the drum by means of a rotary projectile impeller 26 comprising a hub 27 and a series of spoke sections or members 28 radiating from the hub and curved longitudinally as clearly shown in Fig. 6 of the drawings. The projectile impeller, which is keyed or otherwise mounted on a horizontal power shaft 28ª, is designed to be rotated at a relatively high speed and the spoke members are provided with central body portions and laterally extending approximately L-shaped arms 29 projecting from the spoke members at the side edges of the body portions at points intermediate of the ends thereof. The projectile impeller preferably consists of a casting and the spoke members carry blades 30 which extend outwardly beyond the said spoke members, as clearly shown in Fig. 6. The spoke members are provided with substantially radially arranged ribs 31 extending longitudinally of the spokes and projecting from the faces of the blades or wings 30 and adapted to prevent the material acted on by the projectile impeller from moving laterally of the same on the said blades or wings. The laterally projecting arms of the projectile impeller form central side spaces or recesses 32 into which the horizontal inlet or feed pipes project, as clearly shown in Fig. 1 to effect a feed of the material to the rotary projectile impeller at opposite sides thereof. The blades or wings have inner reduced portions extending longitudinally of the spoke members.

The slivers, specks and poor stock collecting on the interior of the screen or foraminous periphery of the rotary drum are removed therefrom by one or more spray pipes 33 preferably located at the top of the casing above the drum and extending transversely of the said casing, as shown, and centrally connected to a suitable water supply pipe 34 having a controlling valve 35, and the slivers and poor stock and specks are removed from the projecting ring at the exterior of the drum by means of a spray or jet pipe 36 located at the upper portion of the casing exteriorly of the drum and provided with a suitable controlling valve.

The casing is provided at such side of the drum with a projecting substantially circular hollow portion 38 receiving the flange of the drum and the projecting ring and terminating at the base of the casing in a sliver outlet 39 which extends to a suitable point. The base of the frame is also provided with a receptacle or tank portion 40 into which the good stock separated by the screen is deposited, and a suitable outlet 41 may be provided at either the front or back of the casing as desired.

The power shaft, which is journaled in suitable bearings of standards 42, passes through stuffing boxes 43 of the casing and carries a pulley 44, but the shaft 28 may be connected with the source of power in any other desired manner. The said shaft 28 has mounted on it a pinion 45 meshing with a gear wheel 46 of a short counter-shaft 47 journaled in suitable bearings of the adjacent standard 42 and the adjacent side of the casing and having keyed or otherwise secured to it a gear wheel or pinion 48, which meshes with the gear 18 of the exterior extension of the hub of the drum head 8. The gear wheels 18 and 46 are relatively large and the pinions or gears 45 and 48 are relatively small so that the screen drum is rotated at a relatively low speed compared with the speed of the shaft on which the projectile impeller is mounted. The action of the projectile impeller is sufficient to cause the good stock to be thrown through the screen of the drum by centrifugal force so that the said stock will be collected at the bottom of the casing. A suitable bearing bracket 49 is mounted on the casing to receive the inner end of the shaft 47, and suitable brackets 50 are mounted on the casing for supporting the flow box. Also the lower portion of the annular extension 38 of the casing is provided at the bottom at the sliver outlet with a suitable door or closure plate 51 arranged over an opening 52 and held in place by flanges 53 forming an interlocking connection between the said cover and the casing and extending into the opening and engaging the casing interiorly thereof. By lifting the door closure sufficiently to disengage the lower flanges from the casing at the bottom of the opening, the cover may be readily pulled out. suitable knobs or handles being provided exteriorly of the cover for enabling the same to be readily grasped by the operator.

The rotary drum, the projectile impeller, the spiral conveyer flange and the other parts which come in contact with the material operated on may be constructed of any suitable material such as copper, bronze or the like and are thus adapted to withstand the effects of the liquid and to secure the desired strength and durability.

From the flow box the stock is fed to the screening mechanism through the side feed pipes and the stock enters the screen from both sides through the horizontal portions of the feed pipes. As it enters the central portion of the impeller from both sides of the same it is instantly taken up by the centrifugal force of the impeller and forced against the peripheral screen plates of the rotary screening drum, the good stock passing through the screen plates which extend entirely around the periphery of the said screen drum. The slivers, specks and poor stock drop back into the drum and are carried to the sliver outlets by the spiral conveyer flange or worm, so that as the screening drum rotates all of the bad stock or poor stock is carried to the openings in the head 7 and passed out through the said openings when the same are at the bottom of the drum, the ring 22, which is mounted exteriorly of the said drum head 7, discharging the poor stock the desired distance from the drum. Any of the poor stock carried up by the ring 22 is washed from the same by the gentle spray 36. The casing is preferably provided at the front and back of the base with outlets for the good stock so that the machine may be set to the best advantage. Two spray pipes 33 are preferably employed in practice for the purpose of spraying against the screen plates or sections as they revolve in order to force the sliver adhering to the screen plates or sections from the same so that the said screen plates or sections are always maintained in a clean condition and are effectually prevented from becoming clogged and interfering with the operation of the machine to its maximum capacity. The good stock is gathered in the base of the machine in the tank or receptacle thereof and may be removed therefrom either at the front or rear of the machine as the operator desires. The impelling force resulting from the operation of the rotary projectile impeller is sufficient to force all the good stock through the screen plates or sections leaving the slivers and the rest of the poor stock to be taken care of by the worm or spiral conveyer. The ribs on the spoke members of the impeller prevent the stock from sliding sidewise or laterally of the blades of the impeller so that all the stock is forced against the screen plates or sections. The drum is made to revolve as slowly as practical to do the work and any suitable gearing may of course be employed to secure the desired relative speed of the rotary drum and the rotary projectile impeller. Access is readily had to the sliver outlet for inspection and cleaning of the outlet.

What is claimed is:

1. A horizontal centrifugal screen including a casing, a rotary drum mounted within the casing and provided with a foraminous or screen periphery, means operating within the drum for forcing the material against the periphery of the same, and a spiral conveyer arranged at the inner face of the periphery of the drum for feeding the refuse laterally of the same.

2. A horizontal centrifugal screen including a casing, a rotary drum mounted within the casing and provided with a foraminous or screen periphery, said drum being provided with a lateral outlet for the refuse, means operating within the drum for forcing the material against the periphery of the same, and a spiral conveyer arranged at the periphery of the drum interiorly thereof for feeding the refuse to the said outlet.

3. A horizontal centrifugal screen including a casing, a rotary drum mounted within the casing and provided with a foraminous or screen periphery, said drum being provided with a lateral outlet for the refuse, means operating within the drum for forcing the material against the periphery of the same, and a spiral flange extending across the drum at the inner face of the periphery thereof and forming a worm for feeding the refuse to the said outlet.

4. A horizontal centrifugal screen including a casing, a rotary drum mounted within the casing and provided with a foraminous or screen periphery, said drum being provided with an outlet for the refuse, and a rotary projectile impeller operating within the drum at a relatively greater speed and having means for forcing the stock against the periphery of the drum, said impeller being also provided with means for preventing the stock from sliding laterally on it.

5. A horizontal centrifugal screen including a casing, a rotary drum mounted within the casing and provided with a foraminous or screen periphery, said drum being provided with an outlet for the refuse, and a rotary projectile impeller operating within the drum at a relatively greater speed and having means for forcing the stock against the periphery of the drum, said impeller being provided with substantially radially arranged ribs adapted to prevent the stock from sliding laterally of the impeller.

6. A horizontal centrifugal screen including a drum provided with a foraminous or screen periphery, and a rotary projectile impeller operating within the drum and provided with spaced ribs located at the pulp engaging faces of the blades and arranged to prevent the stock from sliding laterally on the propeller from either side thereof.

7. A horizontal centrifugal screen including a casing, a rotary drum mounted within the casing and provided with a foraminous or screen periphery, and a rotary impeller operating within the drum and carrying curved transversely disposed blades and provided at the side edges of the blades with projecting ribs extending substantially radially of the impeller and adapted to prevent the stock from sliding laterally from either side of the impeller.

8. A horizontal centrifugal screen including a casing, a rotary drum mounted within the casing and provided with a foraminous or screen periphery, said drum being provided with an outlet for the refuse, and a rotary impeller operating within the drum at a relatively greater speed and comprising a plurality of radially arranged longitudinally curved spoke members having curved transversely disposed blades and provided with longitudinally disposed ribs projecting beyond the blades at the faces thereof to prevent the stock from sliding laterally.

9. A horizontal centrifugal screen including a casing, a rotary drum mounted within the casing and provided with a foraminous or screen periphery, said drum being provided with an outlet for the refuse, and a rotary impeller operating within the drum at a relatively greater speed and provided with transversely disposed blades and having means projecting from the faces of the blades for preventing the stock from sliding laterally of the impeller.

10. A horizontal centrifugal screen including a casing having feed pipes extending into it at the centers of its sides, a rotary drum mounted on the said feed pipes and having a screen periphery, and a rotary projectile impeller mounted within the drum for rotary movement and having an annular series of transversely disposed blades extending outwardly beyond the feed pipes in overlapping relation with the same.

11. A horizontal centrifugal screen including a casing, inlet pipes extending into the casing at the centers of the sides thereof, a rotary screen drum mounted on the inlet pipes and having a lateral outlet, a spiral worm conveyer carried by the drum at the interior of the periphery thereof for feeding the refuse to the outlet, and a rotary projectile impeller mounted for rotary movement within the drum and operating at a relatively high speed and provided with radially arranged spoke members having transversely disposed blades rotating around the inlet pipes which feed the stock to the impeller at opposite sides thereof.

12. A horizontal centrifugal screen including a casing, a rotary drum mounted within the casing and having a screen periphery and provided with a lateral outlet, said drum being also provided at the side having the outlet with an annular flange located exteriorly of the drum and inclosing the outlet and arranged to receive the refuse from the drum, means for feeding the refuse to the outlet, and means operating within the drum for forcing the material against the periphery of the same.

13. A horizontal centrifugal screen including a casing, a rotary drum mounted within the casing and having a screen periphery and provided with a lateral outlet, said drum being also provided at the side having the outlet with a substantially horizontal annular flange inclosing the outlet exteriorly of the drum and arranged to receive the refuse from the same, a ring mounted within the said flange and projecting therefrom, means located within the drum for feeding the refuse to the said outlet, and means operating within the drum for forcing the material against the periphery of the drum.

14. A horizontal centrifugal screen including a casing, inlet pipes extending into the casing at the centers of the sides thereof, a horizontal power shaft extending through the said inlet pipes and arranged transversely of the casing, a rotary drum mounted within the casing on the said inlet pipes, a rotary impeller mounted on the shaft and operating within the said drum, and gearing for transmitting motion from the shaft to the drum.

15. A horizontal centrifugal screen including a casing, a flow box located above the casing and provided with depending pipes having horizontal arms extending into the casing at the centers of the sides thereof, means carried by the casing and connected with the arms for supporting the said pipes, a horizontal shaft extending through the pipes and through the casing transversely of the latter, a rotary drum operating within the casing and journaled on the said pipes and having an exteriorly arranged portion provided with a gear, a rotary impeller mounted on the said shaft, and gearing for connecting the latter with the said gear of the drum.

16. A hollow centrifugal screen including a casing, feed pipes extending into the sides of the casing at the centers thereof, a horizontal shaft extending through the feed pipes and through the casing transversely of the latter, a rotary drum operating within the casing and journaled on the feed pipes, said feed pipes discharging the pulp into the drum at the centers of the sides of the same, and a rotary impeller mounted on the shaft and operating within the drum.

In testimony whereof I affix my signature in presence of two witnesses.

JAMES H. BAKER.

Witnesses:
  A. E. DONNELLY,
  C. S. HARRIS.